United States Patent
Monro

(10) Patent No.: US 6,556,719 B1
(45) Date of Patent: Apr. 29, 2003

(54) PROGRESSIVE BLOCK-BASED CODING FOR IMAGE COMPRESSION

(75) Inventor: Donald Martin Monro, Beckington (GB)

(73) Assignee: University of Bath, Bath (GB)

(*) Notice: Subject to any disclaimer, the term of this patent is extended or adjusted under 35 U.S.C. 154(b) by 0 days.

(21) Appl. No.: 09/375,459

(22) Filed: Aug. 17, 1999

Related U.S. Application Data

(63) Continuation of application No. PCT/GB98/00360, filed on Feb. 5, 1998.

(30) Foreign Application Priority Data

Feb. 19, 1997 (GB) ............................................. 9703441

(51) Int. Cl.$^7$ ................................................. G06K 9/36
(52) U.S. Cl. ........................ 382/248; 382/232; 382/250
(58) Field of Search ................................ 382/250, 245, 382/166, 248, 239, 232; 375/241, 253, 240.1; 341/55, 67, 106

(56) References Cited

U.S. PATENT DOCUMENTS

| | | | | |
|---|---|---|---|---|
| 5,563,960 A | * | 10/1996 | Shapiro | 382/239 |
| 5,768,437 A | * | 6/1998 | Monro et al. | 382/249 |
| 5,818,877 A | * | 10/1998 | Tsai et al. | 375/241 |

FOREIGN PATENT DOCUMENTS

| | | | | |
|---|---|---|---|---|
| EP | 0 327 931 A2 | 8/1989 | ............ | H04N/1/41 |
| EP | 0 551 672 A2 | 7/1993 | ............ | H04N/7/13 |

OTHER PUBLICATIONS

"A DCT–Based Image Coder," Xiong, Guleryuz and Orchard, IEEE Sig. Proc. Lett., vol. 3, No. 11, Nov. 1996, p. 289.
"The JPEG Still Picture compression Standard," Wallace, G.K., Comm. ACM, vol. 34, No. 4, pp. 30–44, 1991.
"Image Compression Using the Spatial–Orientation Tree," Said, A. and Pearlman, W.A., IEEE International Symposium on Circuits and Systems, 1993, (694), pp. 279–282.
"The JPEG Still Picture Compression Standard," Wallace, G.K., *Communications of the Association For Computing Machinery*, vol. 34, No. 4, Apr. 1, 1991, pp. 30–44 XP000228786.
"JPEG: Still Image Data Compression Standard," Pennebaker, W.B., Mitchell, J.L., 1993, Van Nostrand Reinhold, New York, NY USA XP00206756.
"Progressive Coding and Transmission of Digital Diagnostic Pictures," Elnahas, S.E. et al., *IEEE Transactions on Medical Imaging*, Jun. 1986, USA, vol. MI–5, No. 2 pp. 73–83, XP002067594.
"Bit–Plane Encoding: A Technique For Source Encoding," Schwartz, J.W., Barker, R.C., *IEEE Transactions on Aerospace and Electornic Systems*, vol. 2, No. 4, 1966, pp. 385–392, XP002067595.
"Prioritized DCT For Compression and Progressive Transmission of Images," Yunming H., *IEEE Transactions on Image Processing*, vol. 1, No. 4, Oct. 1, 1992, pp. 477–487, XP000380776.
International Search Report for PCT/GB98/00360 mailed Jun. 25, 1998.

* cited by examiner

Primary Examiner—Anh Hong Do
(74) *Attorney, Agent, or Firm*—Wallenstein & Wagner, Ltd.

(57) ABSTRACT

A method of image compression includes significance switching of DCT coefficients in block-based embedded DCT procedures. Bitwise digitized DCT coefficients are passed through successive significance sweeps of the whole image from the most significant down to the least significant coefficient bit planes. With each new sweep, newly significant coefficients may appear within a block, and block-masking is used to transmit the addresses of those newly significant coefficients. An off-mask may also be used. The invention further relates to a hardware or software-based image encoder.

21 Claims, 1 Drawing Sheet

1

PROGRESSIVE BLOCK-BASED CODING FOR IMAGE COMPRESSION

This Application is a continuation of International Application No. PCT/GB98/00360, filed Feb. 5, 1998, now pending (which is hereby incorporated by reference).

TECHNICAL FIELD

The present invention relates to image compression and particularly, although not exclusively, to a progressive block-based embedded DCT coder, and to a method of encoding.

BACKGROUND OF THE INVENTION

The JPEG baseline method for still image coding uses the Discrete Cosine Transform (DCT) in a fixed 8×8 pixel partition. Through a linear quantization table and zig-zag scanning of DCT coefficients, the redundancy and band width characteristics of the DCT are exploited over a range of compressions. Recently, however, it has become clear that the JPEG coder is not particularly efficient at higher compression ratios, and other methods such as wavelets have produced better results while having the advantage of being fully embedded. Some researchers have also attempted to combine DCT with zerotree quantization, usually associated with wavelet transforms: see Xiong, Guleryuz and Orchard, 'A DCT-Based Image Coder', IEEE Sig. Proc. Lett., Vol 3, No 11, November 1996, p289.

It is an object of the present invention to advance the field of image compression generally, and in particular to provide an improved method of image compression which is capable of use with well understood transforms such as the DCT.

SUMMARY OF THE INVENTION

According to a first aspect of the present invention this is provided a method of image compression comprising:
  (a) dividing an image to be compressed into a plurality of image blocks;
  (b) carrying out a two-dimensional block transform on each block to produce a corresponding plurality of coefficient blocks;
  (c) bitwise digitizing the coefficients within each coefficient block to define a plurality of bit planes for each coefficient block;
  (d) defining a group of one or more consecutive bit planes starting with the most significant bit plane;
  (e) selecting those coefficients which first become significant within the group;
  (f) flagging the said selected coefficients;
  (g) transmitting information representative of the positions of the said selected coefficients; and transmitting the bits within the group of the said coefficients; and
  (h) repeating (d) to (g) one or more times, with each new group starting with the most significant bit plane not previously dealt with; and, at each repeated pass, also transmitting the bits within the current group of those coefficients which were previously flagged on an earlier pass.

Such a method could also be applied using the one-dimensional DCT to audio recording.

According to a second aspect of the invention there is provided a coder for encoding images, comprising:
  (a) means for dividing an image to be compressed into a plurality of image blocks;
  (b) means for carrying out a two-dimensional block transform on each block to produce a corresponding plurality of coefficient blocks;
  (c) means for bitwise digitizing the coefficients within each coefficient block to define a plurality of bit planes for each coefficient block;
  (d) means for defining a group of one or more consecutive bit planes starting with the most significant bit plane;
  (e) means for selecting those coefficients which first become significant within the group;
  (f) means for flagging the said selected coefficients;
  (g) means for transmitting information representative of the positions of the said selected coefficients, and for transmitting the bits within the group of the said coefficients; and
  (h) means for repeating (d) to (g) one or more times, with each new group starting with the most significant bit plane not previously dealt with; and means for transmitting, at each repeated pass, the bits within the current group of those coefficients which were previously flagged on an earlier pass.

Preferably, the encoder provides for significance switching of DCT coefficients in block-based embedded DCT image compression. The encoder provides output on one or more data streams that may be terminated within a few bits of any point.

The invention also extends to a video coder/decoder including a coder as claimed in claim 17 and an associated decoder, the decoder being arranged to maintain a running record, as transmission between the coder and the decoder proceeds, of the coefficients which are currently significant.

The preferred two-dimensional block transform of the present invention is the Discrete Cosine Transform, although other transforms such as the Fast Fourier Transform (FFT) or the Lapped Orthogonal Transform could be used.

It will be appreciated that in the method of the present invention the order of transmission is not significant. It is therefore to be understood, except where logic requires, that the various parts of the method are not necessarily carried out sequentially in the order specified in section (d) of claim 1. For example, the bits from the newly selected coefficients could be transmitted either before or after the bits of those coefficients which were previously flagged on an earlier path. Similarly, the bits of those coefficients which were previously flagged on an earlier path could be transmitted either before or after the new coefficients are selected for flagging.

The bit planes are swept consecutively from the most significant bit plane to the least significant bit plane. This may either be repeated separately for each image block, or alternatively all blocks may be dealt with at the first bit plane, then all blocks dealt with at the second bit plane, and so on.

The philosophy of significance switching, as used in the present invention, is that the overheads introduced will be compensated for by the savings in not transmitting bits for small coefficients until they are switched on. Good performance might naturally be expected at high compression ratios, but what is surprising is the excellent performance both for lossless compression and for compression at low ratios. The coder of the present invention is preferably embedded, in other words the bit stream can be stopped within a few bits of any point while still guaranteeing the least possible distortion overall. When used with an appropriate decoder, either coder or decoder can terminate the bit stream as needed, dependent upon the available bandwidth or the available bit budget.

The coder of the present invention has been found to out-perform the base-line JPEG method in peak signal to noise ratio (PSNR) at any compression ratio, and is similar to state-of-the-art wavelet coders. The results show that block transform (for example DCT) coding is competitive across the whole range of compression ratios, including lossless, so that a significance-switched block coder would be capable of meeting the requirements of future image compression standards in an evolutionary manner.

BRIEF DESCRIPTION OF THE DRAWINGS

The invention may be carried into practice a number of ways and one specific embodiment will now be described, by way of example, with reference to the figures in which.

DETAILED DESCRIPTION OF THE PREFERRED EMBODIMENTS

Figure 1:
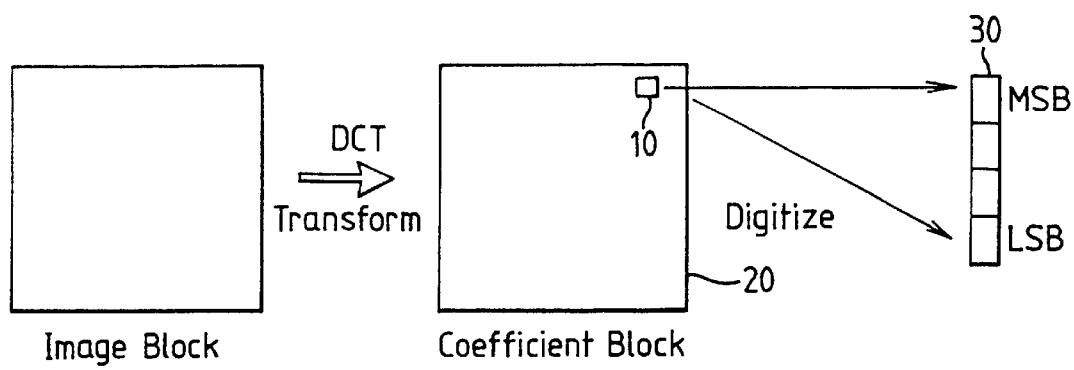
FIG. 1 illustrates the DCT transformation and digitization of image blocks.

In the preferred the preferred method of the present invention, the image to be encoded is first partitioned into a plurality of square image blocks. The partitioning may either be by way of a regular tiling, for example of 8×8 pixel blocks, or alternatively some more complex tiling using blocks of differing sizes. One convenient method of tiling is to vary the block size across the image according to the power in the image (measured by the sum of the squares of pixel intensities). As shown in FIG. 1, each image block is then transformed using the 2D spatial DCT (Discrete Cosine Transform) to produce a corresponding DCT coefficient block of the same size as the original image block. Each of the coefficients within the coefficient block is then digitized and bitwise encoded as shown in FIG. 1. Each coefficient 10 within the coefficient block 20 is therefore represented as a series of individual bits 30, ranging from the most significant bit (MSB) to the least significant bit (LSB). The DCT transformation and digitization preferably follow the scaling used within the JPEG standard: see Wallace, G. K, 'The JPEG Still Picture Compression Standard', Comm. ACCM, Vol. 34, No. 4, pp.30–44, 1991. This scaling represents a compromise which accommodates the full range of possible DCT coefficients with reasonably safe integer roundings.

Figure 3:
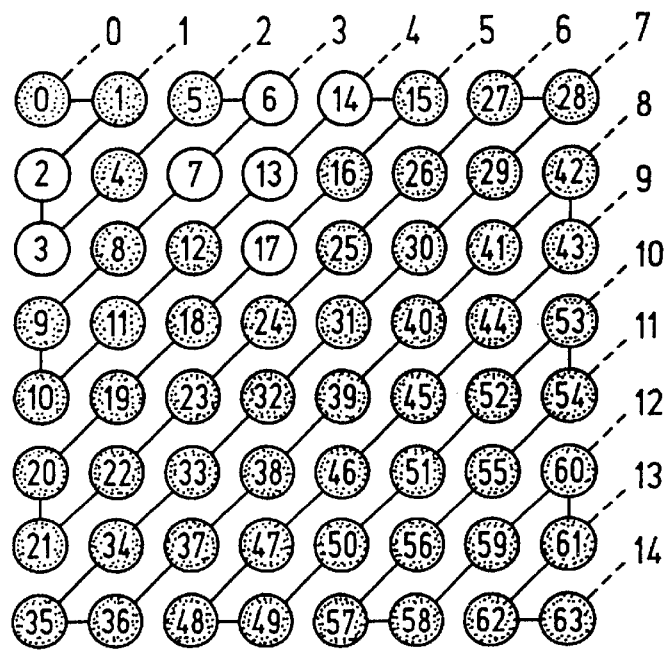
FIG. 3 illustrates the zig-zag ordering of coefficients, and use of the binary mask.

The encoded integer coefficients are now required to be manipulated in a progressive fashion, and transmitted within a data-stream that can be rapidly terminated at any point. In order to achieve this, the integer coefficients are first rearranged into an ordered array using the zig-zag sequence of the JPEG standard. FIG. 3 shows a typical zig-zag sequence for an 8×8 DCT coefficient block. Each coefficient thus has an associated linear zig-zag address which may be used to identify it. The reordering places the coefficients in ascending order of Manhattan distance from the DC term, that is from the term in the top left hand corner of the block which is representative of zero frequency in both the x and the y directions.

Figure 2:
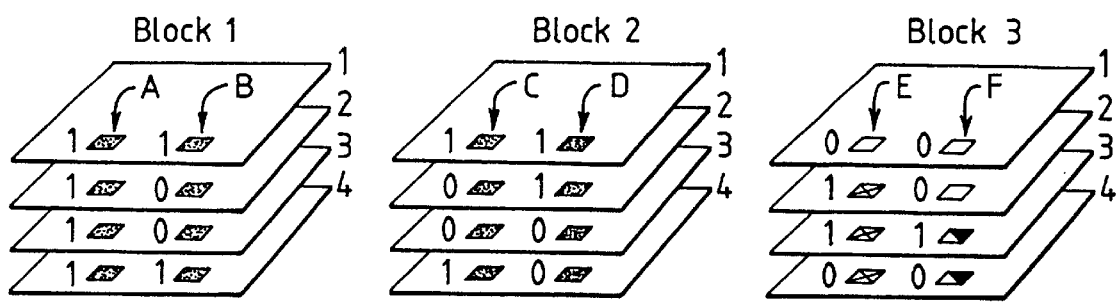
FIG. 2 illustrates the significance sweeps made through the individual bit planes in coefficient space.

Turning now to FIG. 2, there are shown three separate coefficient blocks, numbered 1 to 3. Each block is represented by a plurality of bit planes 1 to 4, with plane 1 containing the most significant bits for each of the digitized coefficients, and plane No. 4 the corresponding least significant bits. It will be understood of course, that in a typical implementation there will normally be many more than three coefficient blocks, and many more than four bit planes: in the preferred embodiment, in fact, there may be twelve bit planes, with each bit plane having 32×32 bits. Other sizes could also be used, for example 8×8 or 16×16.

In order to determine the order in which the individual bits will be transmitted, the following algorithm is used:

Sweep DCT bit planes from MSB to LSB
        Sweep all image blocks
            Switch on significant coefficients
            Send data bits for significant coefficients
        Next block
    Next bit plane This algorithm may perhaps best be described by way of example, with reference to FIG. 2; in this example, it will be assumed for the sake of simplicity that all the values are positive integers. First, a sweep is made across bit plane No. 1 of each of the three blocks 1 to 3, to determine which are the significant coefficients. These will be the largest coefficients, and as the sweep is initially being made across the most significant bits, they may be determined by selecting those entries in which there is a one rather than a zero in bit plane 1. In FIG. 2, those are the coefficients labelled A, B, C and D; coefficients E and F are not yet significant, since their bits in bit plane 1 are zero.

Once the significant coefficients have been selected, all of the corresponding bits in the lower bit planes 2 to 4 are automatically switched on, as indicated by the filled in squares representing the bits of coefficients A to D. The selected bits within bit plane 1 are then transmitted.

Next, a second sweep is made over the whole image across bit plane 2. Bits from coefficients which have already been switched on in the previous sweep are automatically transmitted, so in this example bits 1001 are transmitted, these representing the second most significant bits for the coefficients A to D. Any coefficients which newly become significant at this level, are switched on, as illustrated by the crossed squares representing the second, third and fourth bits for coefficient E. The bits for all such newly significant coefficients on bit plane 2 are also transmitted.

Another sweep is then carried out on the third bit plane. Once again, all the bits representative of coefficients which have already been switched on are automatically sent: in this case, these are the third bits of coefficients A, B, C, D and E. At this level, coefficient F newly becomes significant, and accordingly the one representative of bit 3 of that coefficient is also sent. At the same time, that coefficient is switched on, as indicated by the half-shaded squares representative of the third and fourth bits of that coefficient.

Finally, a sweep is performed across the fourth bit planes. In this example, all of the illustrated coefficients have previously been switched on at a higher level, and hence all of the resultant bits 111000 are transmitted.

The process continues for as many bit planes as were initially required to digitize and bitwise encode each individual coefficient, although the very last bit plane may need to be dealt with as a special case, to be discussed below. The process is progressive, in the sense that the most important information is sent first, so that the transmission may be stopped part-way through if transmission time is limited and/or limited bandwidth is available.

It has been found in practice to be more efficient to exclude the DC component of each block from the above scheme, and to send that separately. Accordingly, in the preferred embodiment switching applied only to the AC terms of the coefficient block. Rather than sweeping across each of the coefficient blocks for a particular bit plane, it would in an alternative embodiment be possible to sweep through all the bit planes within one block before proceeding to the next block. The corresponding algorithm for this would be:

Sweep all image blocks
    Sweep DCT bit planes from MSB to LSB
        Switch on significant coefficients
        Send data bits for significant coefficients
    Next bit plane
Next block During each significance sweep, the significant bits within each bit plane may be sent in any convenient order. For example, within each bit plane, the first bits to be send may be those for each of the coefficients which have already been "switched on" (in other words those coefficients which are already significant); the addresses of any newly-significant coefficients are then transmitted, to switch them on, followed by a stop symbol. Finally, the next bit is sent for all of the newly-significant coefficients. Alternatively, the switches may be sent first followed by all the data: this has the advantage of improving the run length coding of the data.

For improved efficiency at higher compressions, the DC coefficient within each block is preferably sent separately, prior to the significance sweeps of the AC terms.

It should be understood that the system needs to transmit addressing information representative of the positions of those coefficients which are significant. While this could be done simply by transmitting a list of addresses sent in zig-zag order, the applicants have determined that the sending of a binary mask, also in zig-zag order, can further improve efficiency. For example, referring to FIG. 3, let us assume that coefficients 2, 3, 6, 7, 13, 14 and 17 have become newly significant at the bit plane level of the current sweep. Those coefficients then have to be "turned on", so that all the bits corresponding to those coefficients in the lower bit planes will in future automatically be transmitted. That requires the transmission of the addresses of those coefficients.

The applicant has realized that the addresses may be transmitted not directly but by way of a bit mask, in zig-zag order. Thus, in order to switch on the mentioned coefficients (assuming none have previously been switched on), the mask 0011001100000011001 may be sent. A '1' in the mask indicates that that particular coefficient has newly become significant. This may be run length coded as 2020502 STOP.

The coefficients within each DCT block may be negative as well as positive, and if appropriate negative values may be suitably bitwise encoded using a 2's compliment representation. If the coefficient is positive, the "1" bits are significant; if negative the "0" bits are significant. The first data bit sent when a coefficient becomes significant determines the sign.

The final bit plane may need to be dealt with as a special case. Any coefficient not previously switched on will be either 0 or −1. One way of dealing with the final phase is to send a mask only for the −1 coefficients; there is no need to send any data, as all non-significant coefficients are 0 and all those newly switched are −1.

It should be recalled that only new coefficients have to be masked at each pass, since once a coefficient has been switched on it remains switched on until the end of the procedure. The masking method is efficient, with typically fewer bits needed to transmit the switching information than a direct list of coefficient addresses.

Various methods of packaging the mask prior to transmission may be used. The mask may be sent sequentially, followed by a special stop symbol to indicate its end. In an alternative scheme, a length symbol representative of the zig-zag length may be sent before the mask to obviate the need for the special stop symbol. Finally, the mask could be preceded by the Manhattan depth of its highest order coefficient; for example in FIG. 3, the highest order coefficient has zig-zag address 17 and a Manhattan depth of 5. Using Manhattan depth will result in three extra mask bits being set (with the mask being assumed to terminate at the end of the zig-zag line that includes the given Manhattan depth). However, the Manhattan depth requires two fewer bits at all block sizes than would a zig-zag length. Recalling that the DCT packs most of the energy into a small subset of coefficients, leaving a large number of smaller coefficients, it will be understood that the Manhattan depth is more efficient for small values.

In each case, the switching mask will contain mostly "Off" symbols (zeros), which can be efficiently compressed using an arithmetic coder. It is particularly useful to encode the mask data using first order predictive adaptive arithmetic coding, since much of the data comprises long runs of low entropy off symbols. Other methods such as Huffman could also be used to compact the mask data prior to transmission. Run length coding may also be used.

Depending upon the method chosen to package the mask, the output from the coder will take the form of one or more bit streams. In the first arrangement mentioned above, where the mask is terminated by a special stop symbol, the mask and symbol may be sent as one stream with the DCT data being sent as another stream. In the alternatives, where a separate length symbol or Manhattan depth symbol is used, it may be convenient to output three separate streams: one specifying the Manhattan depth, one for the mask data, and one for the DCT data.

Where several separate data streams are used, the synchronization may be controlled so that each stream is maintained within a few bytes of synchrony with the others. This allows a decoder to interrupt the transmission at any time.

At the far end of the transmission stream, a decoder maintains a record of the mask for each image block, giving the current status of each of its DCT coefficients. The mask is updated at each significance pass.

In a variant of the method, an "off" mask may be maintained and sent as well as the "on" mask discussed above. This allows the coder to avoid the sending of bits which are so far down the bit planes as to represent noise rather than real data. In practice, once a coefficient has been significant for several bit planes it may well be sufficiently-well defined for visual purposes, and it could then be turned off.

In a further more general variant of the method, the significance testing need not be carried out for each consecutive bit plane. In many circumstances, it may be more efficient, and may given an acceptable result, to mask several planes at once. This reduces the overhead of masking each bit plane individually.

It will be understood that masking each bit plane separately is mathematically equivalent to making comparisons against a decreasing threshold value which goes as $2^n$. Other threshold values could be used instead, providing for either wider or narrower significance steps. In one embodiment, the bit planes are divided up into groups, with each group being masked separately. Depending on the application, each group might consist of the same number or alternatively of a different number of bit planes. Some of the groups might comprise only a single bit plane, while others are made up of several.

It is found in practice that the mask switching algorithm described above performs slightly better than JPEG at low compression ratios, and substantially better at high compression ratios. Indeed, using a 16×16 block size, performance over the whole range of compression ratios is very similar to that achieved by the wavelet coder of Said and Pearlman: see SAID, A. and PEARLMAN, W. A,: 'Image Compression Using the Spatial-Orientation Tree', IEEE International Symposium on Circuits and Systems, 1993, (694), pp.279–282. The present invention therefore provides state of the art performance while having the advantage of being usable with DCT, a transformation which is widely used and understood as a result of its adoption at the core technology of JPEG and all current versions of MPEG.

In a typical embodiment of the present invention, a video codec (Coder/Decoder) comprises a hardware or software based coder, and a hardware or software based decoder. Bits are transmitted progressively from the coder to the decoder, with the coder being instructed to keep sending bits until a certain compression target has been reached, or a certain distortion achieved. Using the two or three individual streams of data previously referred to, the decoder can progressively reconstruct the image. As the mask data are received, the decoder updates a record, held in memory, of which coefficients are currently switched on. As data transmission proceeds, more and more coefficients are switched on. If the process is allowed to continue until all of the data has been transmitted, the decoder can reconstruct a lossless image, with the exception of any small rounding errors that may have occurred during the DCT digitization process. A decoder in a multi-media system which uses a progressive, embedded coder as described above can begin to reveal an image as soon as transmission commences. This is an advantage often claimed for wavelets, but significance-switched block transforms also have this capability.

What is claimed is:

1. A method of image compression comprising the steps of:
    (a) dividing an image to be compressed into a plurality of image blocks;
    (b) carrying out a two-dimensional block transform on each block to produce a corresponding plurality of coefficient blocks;
    (c) bitwise digitizing the coefficients within each coefficient block to define a plurality of bit planes for each coefficient block;
    (d) defining a group of one or more consecutive bit planes starting with the most significant bit plane;
    (e) selectively flagging those coefficients which first become significant within the group;
    (f) transmitting information representative of the positions of the said flagged coefficients and transmitting the bits within the group of the said coefficients; and,
    (g) repeating steps (d) to (f) one or more times, with each new group starting with the most significant bit plane not previously dealt with and, at each repeated pass, also transmitting the bits within the current group of those coefficients which were previously flagged on an earlier pass.

2. A method as claimed in claim 1 in which step (g) is carried out across the entire image to be compressed.

3. A method as claimed in claim 1 in which step (g) is separately repeated for each image block.

4. A method as claimed in claim 1 in which the block transform is the two-dimensional Discrete Cosine Transform.

5. A method as claimed in claim 1 in which the block transform is the Lapped Orthogonal Transform.

6. A method as claimed in claim 1 in which the block transform is the Fast Fourier Transform.

7. A method as claimed in claim 1 further including, at step (f) transmitting mask information representative of a binary mask which defines the positions of the said selected coefficients.

8. A method as claimed in claim 7 in which the binary mask defines the positions of the selected coefficients within each coefficient block in JPEG zig-zag order.

9. A method as claimed in claim 7 in which the binary mask is associated with a mask length code to define the mask end point.

10. A method as claimed in claim 7 in which the binary mask is associated with a stop-code to define the mask end point.

11. A method as claimed in claim 7 in which transmitted mask information is an entropy-coded version of the mask.

12. A method as claimed in claim 11 in which the transmitted mask information is an arithmetic coded version of the mask.

13. A method as claimed in claim 11 in which the transmitted mask information is a Huffman coded version of the mask.

14. A method as claimed in claim 7 in which the transmitted mask is run length coded.

15. A method as claimed in claim 1 in which the binary mask defines the positions of the selected coefficients within each coefficient block in JPEG zig-zag order, the binary mask is associated with a mask length code to define the mask end point, and the mask length code defines the mask end point zig-zag address.

16. A method as claimed in claim 1 in which the binary mask defines the positions of the selected coefficients within each coefficient block in JPEG zig-zag order, the binary mask is associated with a mask length code to define the mask end point, and the mask length code defines the Manhattan distance from a DC term to the mask end point.

17. A method as claimed in claim 1 further including the step of transmitting information representative of a binary off-mask for defining the positions of coefficients whose bits are no longer required to be sent.

18. A coder for encoding images, comprising the steps of:
    (a) means for dividing an image to be compressed into a plurality of image blocks;
    (b) means for carrying out a two-dimensional block transform on each block to produce a corresponding plurality of coefficient blocks;
    (c) means for bitwise digitizing the coefficients within each coefficient block to define a plurality of bit planes for each coefficient block;
    (d) means for defining a group of one or more consecutive bit planes starting with the most significant bit plane;
    (e) means for selectively flagging those coefficients which first become significant within the group;
    (f) means for transmitting information representative of the positions of the said flagged coefficients and for transmitting the bits within the group of the said coefficients; and,
    (g) means for repeating steps (d) to (f) one or more times, with each new group starting with the most significant bit plane not previously dealt with, and means for transmitting, at each repeated pass, the bits within the current group of those coefficients which were previously flagged on an earlier pass.

19. A coder as claimed in claim 18 in which the means for transmitting information representative of the positions of the said selected coefficients comprise binary mask means.

20. A coder as claimed in claim 19 including means for transmitting, as synchronized data streams, the coefficient bits and mask information.

21. A video coder/decoder comprising a coder and an associated decoder,
(1) the coder encoding images and comprising the steps of:
    (a) means for dividing an image to be compressed into a plurality of image blocks;
    (b) means for carrying out a two-dimensional block transform on each block to produce a corresponding plurality of coefficient blocks;
    (c) means for bitwise digitizing the coefficients with each coefficient block to define a plurality of bit planes for each coefficient block;
    (d) means for defining a group of one or more consecutive bit planes starting with the most significant bit plane;
    (e) means for selectively flagging those coefficients which first become significant within the group;
    (f) means for transmitting information representative of the positions of the said flagged coefficients and for transmitting the bits within the group of the said coefficients; and,
    (g) means for repeating steps (d) to (f) one or more times, with each new group starting with the most significant bit plane not previously dealt with, and means for transmitting, at each repeated pass, the bits within the current group of those coefficients which were previously flagged on an earlier pass,
(2) the decoder being arranged to maintain a running record, as transmission between the coder and the decoder proceeds, of the coefficients which are currently significant.

* * * * *